United States Patent Office 3,240,765
Patented Mar. 15, 1966

3,240,765
THIOCARBONYL FLUORIDES AND
THEIR POLYMERS
William J. Middleton, Wilmington, Del., assignor to E. I.
du Pont de Nemours and Company, Wilmington, Del.,
a corporation of Delaware
No Drawing. Filed May 1, 1961, Ser. No. 106,533
12 Claims. (Cl. 260—79)

This is a continuation-in-part of applications Serial No. 665,142, filed June 12, 1957, now U.S. Patent 2,980,695, and Serial No. 817,976, filed June 4, 1959, now abandoned.

This invention relates to fluorine- and sulfur-containing monomers and more particularly to novel inert polymers prepared therefrom.

The polymers of this invention comprise polymers of thiocarbonyl fluoride and thiocarbonyl chloride fluoride, including copolymers of these monomers with other copolymerizable monomers. These polymers have recurring structural units of the formula

wherein X is fluorine or chlorine.

These polymers range from low molecular weight, i.e., about 2000, waxy solids melting at 30–40° C. to high molecular weight, tough, solid polymers softening at temperatures up to 230° C. These polymers have inherent viscosities, measured at 0.1% concentration in chloroform at 25° C., of up to about 5. The solid polymers can be pressed at elevated temperatures and pressures into rubbery films. Some of these pressed films crystallize on standing at ordinary temperatures to opaque plastic films.

In brief, a method of preparing the polymers is as follows: Thiophosgene dimer (tetrachloro-1,3-dithietane) is fluorinated and the resulting polyfluoro-1,3-dithietane is pyrolyzed. The resulting thiocarbonyl fluoride is then polymerized by any of a variety of methods. More will be said later about the various polymerization methods.

The preparation of the polyfluoro-1,3-dithietane involves the reaction of tetrachloro-1,3-dithietane with antimony trifluoride. The proportions should be such that there is an amount of antimony trifluoride at least stoichiometrically equivalent to the tetrachlorodithietane present. Preferably an excess of antimony trifluoride, e.g., up to 100% excess or more can be present. A reaction medium which is a solvent for the antimony trifluoride, such as tetramethylene sulfone, is ordinarily present. Both tetrafluoro-1,3-dithietane and monochlorotrifluoro-1,3-dithietane are produced.

The temperature of reaction should be at least 90° C. and preferably between 90° and 200° C. Little reaction takes place at temperatures below 90° C.

Reaction pressures are not critical. Atmospheric pressure is quite satisfactory although subatmospheric or superatmospheric pressures can be ued if desired. The use of low pressure such as less than atmospheric generally favors the formation of the monochlorotrifluoro-1,3-dithietane. The reaction time is not critical, periods ranging from 15 minutes to 2 hours at temperatures above 90° C. being satisfactory. At the termination of the reaction, the tetrafluoro-1,3-dithietane and monochlorotrifluoro-1,3-dithietane that are formed are isolated.

The fluorination of the tetrachloro-1,3-dithietane can also be accomplished by the use of hydrogen fluoride in the presence of antimony trifluoride, antimony pentafluoride or other fluorine carrier. In this embodiment the hydrogen fluoride used in excess acts as solvent for the reaction.

Thiocarbonyl fluorides are produced by the pyrolysis of the aforementioned polyfluoro-1,3-dithietanes. Pyrolysis temperatures range from about 400° to 900° C., with temperatures of 450° to 500° C. being especially suitable. The reaction pressure is not critical, atmospheric, superatmospheric, or subatmospheric pressures all being operable. A convenient way of carrying out the pyrolysis is by passing the polyfluoro-1,3-dithietane through a reaction tube constructed of an inert metal such as nickel or platinum which has been heated to the reaction temperature. Preferably an inert diluent such as helium or nitrogen is passed through the reaction tube concurrently with the polyfluoro-1,3-dithietane as this improves the yield of the desired product.

When tetrafluoro-1,3-dithietane is pyrolyzed as described above, thiocarbonyl fluoride, $S=CF_2$, containing less than 5% of sulfur- or fluorine-bearing non-polymerizable impurities is formed. This high degree of purity renders the product especially useful for polymerization. Thiocarbonyl fluoride of purity greater than 95% can be polymerized to chemically inert polymers of at least 2000 molecular weight, whereas the known thiocarbonyl chloride cannot be polymerized to such polymers. Also, this highly pure product does not etch glass.

When monochlorotrifluoro-1,3-dithietane is pyrolyzed as described above, the product comprises a major proportion of thiocarbonyl fluoride and minor proportions of thiocarbonyl chloride fluoride and thiocarbonyl chloride. Thiocarbonyl chloride fluoride is useful for fumigation.

As already indicated, the polymers of this invention can be prepared from thiocarbonyl fluoride and thiocarbonyl chloride fluoride by various methods, including both bulk and solution methods. The monomeric thiocarbonyl fluoride and the thiocarbonyl chloride fluoride can be polymerized alone or in combination with one or more other copolymerizable monomers in the presence of free radical-liberating initiators, e.g., benzoyl peroxide, trialkylboron/oxygen, and azodiisobutyronitrile, ultraviolet light, and in the presence of ionic initiators, especially anionic initiators, e.g., dimethylformamide.

Thiocarbonyl fluoride, prepared as described previously, undergoes spontaneous polymerization on storage at ordinary temperatures for periods ranging from 2 or 3 days up to several weeks with the formation of solid polymers having recurring —S—$CF_2$— units. The polymers obtained in this way range from low molecular weight, waxy solids to high molecular weight solids that can be pressed at elevated temperatures and pressures into tough rubbery films. The higher molecular weight polymers are obtained by use of high purity thiocarbonyl fluoride with anionic polymerization initiators. The low molecular weight waxy polymers are insoluble in most common solvents but are soluble in chloroform. These chloroform solutions are useful for coating wood, metal or glass to give a chemically inert waxy finish.

In addition to the spontaneous polymerization described above, the thiocarbonyl fluoride and the thiocarbonyl chloride fluoride can also be polymerized by themselves or in combination with each other or with one or more other copolymerizable monomers in the presence of an addition polymerization initiator such as a free radical-liberating initiator, ultraviolet light, or an ionic initiator. These polymerizations can be carried out by either bulk or solution methods at temperatures ranging from —120° C. or lower up to 150° C. or higher. The operating pressures at which the polymerizations are carried out are not critical.

The polymerization in the presence of ionic initiators is conveniently carried out at very low temperatures, e.g., at temperatures between 0° and —120° C. or lower, in the presence of a solvent such as an ether, e.g., diethyl ether or tetrahydrofuran, or a hydrocarbon, e.g., pentane, that remains liquid at the operating temperature that is being employed. The preferred temperature range for carrying out the polymerization is between —50° and — 100° C. In this temperature range diethyl ether is a particularly effective solvent. Under these conditions solid polymers are obtained. The polymerization times required vary from about 1 hour up to several days, e.g., 3–4 days, depending on the particular operating conditions and the particular monomers and initiators being used.

A wide variety of ionic initiators can be used in this process. Specific initiators that are operable include amides, e.g., dimethylformamide, and N-methylacetamide; primary, secondary and tertiary amines, e.g., triethylamine, diisopropylamine, N - methylmorpholine, tetrakis(dimethylamino)ethylene; and nitrosodimethylamine; phosphines, e.g., triphenylphosphine; quaternary ammonium chlorides having no hydrogen on the quaternary ammonium nitrogen, e.g., tetraethyl quaternary ammonium chloride; quaternary ammonium methoxide; cesium fluoride; and metal alkyls, e.g., butyl lithium. Anionic initiators, particularly dimethylformamide, are especially suitable for making high molecular weight polymers. The ionic initiators are normally employed in concentrations ranging from about 0.2% to 20% of the weight of the monomers being polymerized, but amounts as low as 0.01% or even less, can be used effectively.

The polymerization in the presence of ultraviolet light as the initiator is conveniently carried out in the presence of a photoinitiator, e.g., benzoin methyl ether, and in an inert solvent such as a highly halogenated hydrocarbon, e.g., dichlorodifluoromethane. Any convenient source of ultraviolet light can be used. For example, any of the commercially available lamps that are relatively high in ultraviolet output are suitable. Generally speaking, mercury vapor arc lamps are preferred since they provide a relatively intense source of ultraviolet light. Many lamps of this type are available and they include low and high pressure lamps with various types of envelopes. The most preferred are those having quartz envelopes since such envelopes permit the highest percent transmission of ultraviolet light. The temperature and pressure at which the polymerization in the presence of ultraviolet light is carried out are not critical. It is convenient to use room temperature and atmospheric pressure but lower or higher temperatures and lower or higher pressures can be used if desired. It is convenient to carry out the polymerization at room temperature or at the boiling point of the solvent being used. At ordinary temperatures and pressures, the polymerization can be carried out for times ranging from 1 hour to several days.

The thiocarbonyl fluoride and thiocarbonyl chloride fluoride can also be polymerized alone or in combination with each other and with any other copolymerizable monomers in the presence of free radical-liberating initiators. These initiators which can be either of the peroxy type, e.g., benzoyl peroxide, the trialkylboron/oxidant type, e.g., triethylboron/oxygen, or the azo type, e.g., α,α'-azodiisobutyronitrole, can be used in proportions ranging from 0.1% to 10% of the weight of the polymerizable monomers, but even smaller amounts, e.g., amounts as low as 0.005%, have a catalytic effect. The polymerization can be carried out in the presence or absence of an inert solvent. Examples of suitable solvents include tetrafluoro - 1,3 - diethietane, dichlorodifluoromethane, chloroform and carbon disulfide. The mixture is maintained at a temperature at which the polymerization initiator generates free radicals rapidly. The exact temperature selected depends on the particular initiator being used. Temperatures ranging from about —120° C. up to about 150° C. or higher are useful.

While both thiocarbonyl fluoride and thiocarbonyl chloride fluoride can be polymerized in contradistinction to thiocarbonyl chloride, there is a great difference in the rates of polymerization between thiocarbonyl fluoride and thiocarbonyl chloride fluoride with different initiator systems. For example, thiocarbonyl fluoride polymerizes much more rapidly than thiocarbonyl chloride fluoride in the presence of anionic initiators. On the other hand, thiocarbonyl chloride fluoride polymerizes much more rapidly than thiocarbonyl fluoride in the presence of free radical-liberating initiators.

Thiocarbonyl fluoride polymerizes best at temperatures below —50° C., e.g., at —70° C.; whereas thiocarbonyl chloride fluoride polymerizes readily at 0° C. and higher, even with the same initiator system. Polymeric thiocarbonyl fluoride is an elastomer at temperatures above 35° C. but it crystallizes at room temperature and loses its elastomeric properties. On the other hand, polymeric thiocarbonyl chloride fluoride does not crystallize at temperatures as low as —80° C., and retains good elastomeric properties at low temperatures, e.g., at temperatures below 0° C.

As indicated above, the polymers of this invention include homopolymers of thiocarbonyl fluoride and of thiocarbonyl chloride fluoride as well as copolymers of these two monomers and copolymers with one or more other copolymerizable monomers. Preferably the copolymers contain at least 5 mole percent of thiocarbonyl fluoride or thiocarbonyl chloride fluoride. Examples of typical copolymerizable monomers that can be used to prepare the polymers of this invention include ethylenically unsaturated compounds that undergo vinyl type polymerization, e.g., propylene, vinyl acetate, vinyl fluoride and tetrafluoroethylene; copolymerizable carbonyl and thiocarbonyl compounds, including thioacyl fluorides, e.g., trifluorothioacetyl fluoride; and perfluorocyclobutanone. These comonomers can be used in mixtures with thiocarbonyl fluoride and thiocarbonyl chloride fluoride in the desired proportions and the mixtures subjected to the polymerizing conditions described in the preceding paragraphs.

The thiophosgene dimer (tetrachloro-1,3-dithietane) used as starting material in preparing the monomers of this invention may be prepared by known methods. For example, it is conveniently prepared by irradiation of thiophosgene with ultraviolet light as described by Schonberg and Stephenson, Ber. 66B, 567 (1933).

The invention is illustrated further by the following examples in which the proportions of ingredients are expressed in parts by weight unless otherwise noted.

EXAMPLE I

*Preparation of thiocarbonyl fluoride by pyrolysis of tetrafluoro-1,3-dithietane*

Forty grams of tetrafluoro-1,3-dithietane, B.P. 49° C., M.P. —6° C., $n_D^{25}$ 1.3908, $d_4^{20}$ 1.6036, having been purified by vigorous agitation with a mixture of 5 parts of 10% aqueous sodium hydroxide solution and 1 part of 30% aqueous hydrogen peroxide until the yellow color disappears, followed by drying of the lower organic layer over silica gel and distillation, is added dropwise over a period of 2 hours to the top of a platinum tube ½ inch in diameter and 25 inches long inclined at an angle of 30° to the horizontal and heated to 500° C. over a length of 12 inches. A slow stream of helium (20 ml. per minute) is passed through the tube during the pyrolysis The effluent gases are condensed in successive traps cooled by a mixture of acetone and carbon dioxide and liquid nitrogen, respectively. The material in the traps is combined and distilled through a 16-inch column packed with glass helixes. There is obtained 34.0 g. (85% yield) of a colorless liquid, boiling at —54° C. Analysis of this product by the mass spectrometer indicates it to be thiocarbony fluoride, $CSF_2$, of 98% purity.

EXAMPLE II

*Preparation of thiocarbonyl chloride fluoride by pyrolysis of chlorotrifluoro-1,3-dithietane*

Using the apparatus and procedure of Example I, 9.03 g. of chlorotrifluoro-1,3-dithietane is pyrolyzed during a period of 1 hour at 500° C. There is obtained by distillation of the condensates in the two cold traps 4.3 g. of nearly colorless thiocarbonyl fluoride, boiling at −54° C., 1.18 g. of yellow thiocarbonyl chloride fluoride, CSFCl, boiling at 6° C. and 1.38 g. of red thiophosgene, $CSCl_2$, boiling at 72–74° C. Thiocarbonyl fluoride and thiocarbonyl chloride fluoride are identified by their nuclear magnetic resonance spectra and their mass spectrometer patterns.

EXAMPLE III

*Preparation of poly(thiocarbonyl fluoride)*

Thiocarbonyl fluoride of 95.5% purity is placed in a stainless steel container and stored at room temperature for 6 weeks. The container is then opened and a clear syrupy residue is removed. After storage in a vacuum desiccator for 2 days, this residue solidifies to a white wax melting at 30–35° C. The polymer is not visibly affected by boiling concentrated nitric acid or by boiling 10% sodium hydroxide solution. The poly(thiocarbonyl fluoride) is soluble in chloroform and it can be reprecipitated from the chloroform solution by addition of methyl alcohol.

*Analysis.*—Calc'd for $(CF_2S)_n$: C, 14.63%; F, 46.30%; S, 39.06%. Found: C, 14.79%; F, 46.62%; S, 39.11%.

The molecular weight determination was made by dissolving a weighed amount of polymer in tetrachlorodifluoroethane, measuring the freezing point depression and calculating the molecular weight by standard procedures. In this example, 0.176 g. of polymer dissolved in 47.8 g. of tetrachlorodifluoroethane depressed the freezing point 0.077° C. This corresponds to a molecular weight of 2150.

EXAMPLE IV

*Preparation of poly(thiocarbonyl fluoride)*

Three grams of thiocarbonyl fluoride and 0.03 g. of α,α'-azodiisobutyronitrile are placed in a platinum tube. The tube is then sealed and heated at 75° C. for 3 hours, 80° C. for 6 hours, and 85° C. for 3 hours at 3000 atmospheres pressure. After the reaction tube is cooled and opened, there is obtained 3.0 g. of waxy poly(thiocarbonyl fluoride) similar to the polymer of Example III.

EXAMPLE V

*Preparation of poly(thiocarbonyl fluoride)*

Thiocarbonyl fluoride is prepared as described in Example I by the pyrolysis of 20 g. of tetrafluoro-1,3-dithietane at 450° C. The freshly prepared thiocarbonyl fluoride is transferred under nitrogen to a 100-ml. flask cooled to −80° C. and connected to a condenser cooled by solid carbon dioxide. As the liquid thiocarbonyl fluoride is stirred by a magnetic stirrer, 1 ml. of a saturated solution of sodium cyanide in dimethylformamide is introduced rapidly by means of a syringe. Within a few seconds the material in the flask begins to solidify. The flask is held at −80° C. for 2 hours, at the end of which time a solid white cake forms, which stops the stirrer. As the flask is warmed to room temperature, the top of the solid cake becomes black and gummy. The rubbery solid in the flask is cut into pieces and removed, and the black portion is cut away from the white. The white solid is washed with water and dried. There is obtained 3.1 g. of white poly(thiocarbonyl fluoride). A film is pressed at 180° C. and 10,000 lb./sq. in. for 15 seconds. The film is white and rubbery. It loses its rubbery characteristic and becomes soft at 230° C. and decomposes into gaseous product at 270° C. The film is still flexible, although somewhat stiffer, when cooled to −80° C.

The black, gummy material obtained in this reaction is boiled with concentrated nitric acid for 30 minutes. Most of the color is removed and 9.7 g. of light yellow, rubbery poly(thiocarbonyl fluoride) is obtained. This material is also pressed into a rubbery film under the same conditions as the white product.

The polymer (both the white and the black portions) is insoluble in, and unaffected by boiling concentrated nitric acid, 10% aqueous sodium hydroxide, acetone, ethanol, methanol, dioxane, dimethyl sulfoxide, formamide, and sulfuric acid at 150° C.

EXAMPLE VI

*Preparation of poly(thiocarbonyl fluoride)*

Thiocarbonyl fluoride, 1.5 g., and tetrafluoro-1,3-dithietane (as solvent), 1.5 g., are sealed in a platinum tube and heated to 75° C. for 3 hours, 80° C. for 6 hours, and 85° C. for 3 hours at 3000 atmospheres pressure. After cooling, the tube is cut open and the sticky polymer is dissolved in chloroform and precipitated with methanol. There is obtained 1.2 g. of white waxy poly(thiocarbonyl fluoride), M.P. 35–40° C.

EXAMPLE VII

*Preparation of poly(thiocarbonyl fluoride)*

Thiocarbonyl fluoride is prepared as described previously by the pyrolysis of 10 g. of purified tetrafluoro-1,3-dithietane at 450° C. A 500-ml. flask with an inlet and outlet tube and fitted with a magnetic stirrer and a condenser cooled by solid carbon dioxide is charged with 300 ml. of pentane (dried over sodium and passed through silica gel) and ¼ ml. of a saturated solution of sodium cyanide in dimethylformamide. The flask is flushed with nitrogen and 50 ml. of the pentane is distilled from the flask. The flask was then immersed in an acetone-solid carbon dioxide bath and the condenser is charged with acetone-solid carbon dioxide. The thiocarbonyl fluoride is then slowly distilled into the vigorously stirred pentane solution. A white suspension of polymer forms immediately. The reaction mixture is stirred for an additional two hours with cooling and is then allowed to warm to room temperature (about 25° C.). The polymer is collected on a filter, washed with methanol, then with dilute nitric acid, and finally with methanol again. It is dried in a vacuum desiccator over phosphorus pentoxide and paraffin for two days. There is obtained 8.5 g. (85% conversion from the dithietane) of a white, rubbery solid.

*Analysis.*—Calc'd for $(CSF_2)_n$: C, 14.63%; S, 39.06%; F, 46.30%. Found: C, 14.72%; S, 39.16%; F, 46.11%.

A transparent rubbery film is pressed from this polymer at 150° C. and 10,000 lb./sq. in. This film possesses a zero strength temperature of 231° C.

EXAMPLE VIII

Eighteen grams of liquid thiocarbonyl fluoride is vaporized into a dry glass reaction vessel containing approximately 0.02 ml. of a saturated solution of sodium cyanide in dimethylformamide as polymerization initiator, and 50 ml. of dry diethyl ether as polymerization medium, at a temperature of −80° C. The thiocarbonyl fluoride begins to polymerize immediately under these conditions. After holding the polymerization vessel at −80° C. for 20 hours, approximately 25 ml. of 50% aqueous nitric acid is added to destroy the initiator. The polymer, amounting to 12.3 g., is removed, boiled with water for 15 minutes to expel ether and is dried at 60° C. in a vacuum oven. There is obtained a substantially quantitative yield of a white, tough, spongy polymer of thiocarbonyl fluoride having an inherent viscosity of 3.7 (measured at 0.1% concentration in chloroform at 25° C.). A rubbery film is obtained by pressing this polymer at 150° C. under 12,000 lb./sq. in. pressure for 10 minutes. When held under tension, the film draws about three times its original length. The drawn film has a tensile strength of 10,800 lb./sq. in. at 58% elongation. The polymer crystallizes slowly at room temperature to a white, opaque, waxy plastic. When this material is held at a temperature above 36° C., the melting point of the polymer, it reverts to the amorphous elastomeric form. A ball of this polymer of 2.23 cu. in. volume (molded at 150° C., 6000 lb. pressure) rebounds about 90% of the distance from which it is dropped.

EXAMPLE IX

Four and one-half grams of liquid thiocarbonyl fluoride is led into a polymerization vessel containing 25 ml. of anhydrous diethyl ether and approximately 0.02 ml. of dimethylformamide. The polymerization is carried out at −80° C. for 18 hours. The polymer is isolated and purified as described in Example VIII. There is obtained a substantially quantitative yield.

EXAMPLE X

The polymerization of thiocarbonyl fluoride is carried out as described in Example IX with the single exception that N-methylacetamide is substituted for dimethylformamide as the initiator. There is obtained a substantially quantitative yield of a tough elastomeric thiocarbonyl fluoride polymer having an inherent viscosity of 3.6, measured at 0.1% concentration in chloroform at 25° C.

EXAMPLE XI

The polymerization of thiocarbonyl fluoride is carried out as described in Example IX with the exception that triethylamine is used as initiator instead of dimethylformamide. There is obtained a white polymer that becomes colored on warming to room temperature. This discoloration of the polymer is caused by incomplete removal of the triethylamine initiator during the purification of the polymer.

EXAMPLE XII

Thiocarbonyl fluoride (3.75 g.) is vaporized into a polymerization vessel containing 20 ml. of anyhdrous diethyl ether and approximately 0.03 ml. of tetrakis(dimethylamino)ethylene as initiator. The polymerization is carried out and the polymer isolated as described in Example VIII. There is obtained an approximate 50% yield of a soft, low molecular weight thiocarbonyl fluoride polymer.

EXAMPLE XIII

Thiocarbonyl fluoride (3.45 g.) is distilled into a reaction vessel containing 10 ml. of anhydrous diethyl ether and approximately 0.03 ml. of a 20% solution of triphenylphosphine in diethyl ether as initiator. The polymerization is carried out and the polymer is isolated as described in Example VIII. There is obtained an approximate 30% yield of polymer of thiocarbonyl fluoride. The low yield is caused by the difficulty encountered in removing the initiator before warming the polymer to room temperature.

EXAMPLE XIV

Thiocarbonyl fluoride (3.75 g.) is vaporized into a polymerization vessel containing 20 ml. of anhydrous diethyl ether and approximately 0.04 ml. of N-nitrosodimethylamine as initiator. The polymerization is carried out and the polymer is isolated under the conditions described in Example VIII. There is obtained a substantially quantitative yield of tough, elastomeric thiocarbonyl fluoride polymer.

EXAMPLE XV

Thiocarbonyl fluoride (3.45 g.) is vaporized into a polymerization vessel containing 25 ml. of anhydrous diethyl ether and approximately 0.03 ml. of a solution comprising 0.144 g. of butyl lithium per ml. of hexane as initiator. The polymerization and the polymer isolation are carried out as described in Example VIII. There is obtained a substantially quantitative yield of moderately tough polymer of thiocarbonyl fluoride.

EXAMPLE XVI

A glass reaction vessel equipped with an inlet for introducing reactants is purged with nitrogen and cooled to 0° C. Into the reaction vessel there are introduced, in turn, 0.8 g. of thiocarbonyl chloride fluoride, 0.015 g. of tri-n-butylboron, and 2.0 cc. of air (measured at normal temperature and pressure). The mixture is maintained at 0° C. for 2 hours. During the first 30 minutes, the originally mobile liquid increases markedly in viscosity, and the bright, yellow color of the thiocarbonyl chloride fluoride gradually decreases in intensity. After 2 hours the liquid no longer flows under the influence of gravity. Excess methyl alcohol is added to the mixture to precipitate the product. The precipitated poly(thiocarbonyl chloride fluoride) is washed with methyl alcohol and dried. The dried polymer, amounting to 0.2 g., is a tough, rubbery solid. A film pressed from this polymer at 75° C. is elastomeric at 0° C. and shows no tendency to crystallize at −80° C.

EXAMPLE XVII

In a polymerization vessel cooled in a solid carbon dioxide/acetone mixture and blanketed with helium, are placed 20 ml. of anhydrous diethyl ether, 10.5 g. of thiocarbonyl fluoride, and 3.0 g. of trifluorothioacetyl fluoride. To the resulting solution is added a solution of about 0.1 g. of N-methylmorpholine in 5 ml. of anhydrous ether. Polymerization begins almost immediately. After 5 hours much solid polymer has precipitated and the reaction mixture is poured into hot hydrochloric acid (concentrated hydrochloric acid diluted with an equal volume of water). The polymer is washed with water and with acetone and is dried in vacuo at 60° C. It amounts to 9.7 g.

The crude polymer is dissolved in 400 ml. of chloroform (no residue) and is precipitated by adding 50 ml. of methanol to the chloroform solution. The filtered and dried (60° C. in vacuo) polymer amounts to 8.8 g. The polymer can be pressed to a limp opaque film at 150° C. and 10,000 lb. ram pressure. The polymer slowly crystallizes on standing at room temperature. It exhibits an inherent viscosity of 1.19, measured in 0.1% chloroform solution at 25° C. Analyses indicate a $CF_2S/CF_3CSF$ ratio of 88:12. The ratio of monomers charged is 85:15.

*Analysis.*—Calc'd for $(CF_2S)_8(CF_3CSF)_1$: C, 15.3%; F, 48.2%; S, 36.5%. Found: C, 15.36%; F, 48.78%; S, 36.53%.

EXAMPLE XVIII

In a polymerization vessel cooled in a solid carbon dioxide/acetone mixture and blanketed with helium are placed 20 ml. of anhydrous diethyl ether, 6.7 g. of thiocarbonyl fluoride, and 0.32 g. of chlorofluorothioacetyl fluoride. To this solution is added a solution of about 0.5 g. of dimethylformamide in 2.5 ml. of diethyl ether. After 5 hours at −80° C. the reaction mixture is poured into a large excess of hexane and the precipitated copolymer is filtered out. The polymer obtained after air-drying amounts to 7.3 g. It is dissolved in 400 ml. of chloroform and then precipitated by the addition of 50 ml. of methanol. After air-drying, this copolymer of thiocarbonyl fluoride and chlorofluorothioacetyl fluoride can be pressed to a clear, snappy, tough film at 150° C. under 10,000 lbs. pressure. This polymer has an inherent viscosity of 1.45 (measured at 0.1% concentration in chloroform at 25° C.) and contains 0.29% chlorine.

The copolymer of Example XVIII is combined with two other samples of copolymers made in the same way and dissolved in 1,4-bis(trifluoromethyl)benzene to form a clear viscous solution of 6.0% solids. The solution is spread on a glass plate and the solvent is evaporated from the film at room temperature followed by final drying in a vacuum oven at 60° C. Talc is applied to the film, which is then cut into strips and released from the glass plate by immersion in water. After drying, the strips are found to have the following physical characteristics:

| | |
|---|---|
| Tenacity _____ g./den__ | 0.015 |
| Elongation _____ percent__ | 432 |
| Modulus at 50% elongation _____ g./den__ | 0.012 |
| Stress decay _____ percent__ | 27 |
| Tensile recovery _____ do___ | 70 |
| Modulus ratio _____ | 0.46 |

EXAMPLE XIX

In a polymerization vessel cooled in a solid carbon dioxide/acetone bath and blanketed with nitrogen are placed 20 ml. of anhydrous diethyl ether, 6 g. of thiocarbonyl fluoride, 2.3 g. of trifluorothioacetyl fluoride, and 0.8 g. of chlorofluorothioacetyl fluoride. To the resulting solution is added a solution of about 0.5 g. of N-methylmorpholine in 5 ml. of diethyl ether. Polymerization begins immediately. After 5 hours the reaction mixture is poured into methanol, the methanol is decanted, and the residue is washed with methanol and dried in air at room temperature. The resultant copolymer amounts to 5.4 g. The copolymer is dissolved in 300 ml. of chloroform (no residue) and is precipitated with 75 ml. of methanol. After drying in vacuo at 60° C. the polymer amounts to 5.0 g. The polymer can be pressed to limp, semi-elastic, opaque film at 150° C. and 10,000 lb. ram pressure. The polymer has an inherent viscosity of 0.82, measured at 0.1% concentration in chloroform at 25° C., and is shown by elemental analysis to contain all three comonomers. Analysis found: S, 34.47%; Cl, 1.11%.

EXAMPLE XX

In a polymerization vessel cooled in a solid carbon dioxide/acetone mixture and blanketed with nitrogen are placed 20 ml. of anhydrous diethyl ether, 7.5 g. of thiocarbonyl fluoride and 0.3 g. of chlorofluorothioacetyl fluoride. To the resulting solution is added a solution of about 0.05 g. of dimethylformamide in 6 ml. of anhydrous diethyl ether. The reaction mixture is stirred at −80° C. for 5 hours at which time all the yellow color of the chlorofluorothioacetyl fluoride has disappeared and much solid polymer has precipitated. The reaction mixture is poured into excess hexane and is filtered. The solid copolymer is air-dried (amount 4.4 g.) and is dissolved in 200 ml. of chloroform. Precipitation with 30 ml. of methanol and air-drying gives 3.8 g. of polymer than can be pressed to a clear, snappy film at 150° C. and 10,000 lb. ram pressure.

This polymer can be cold-drawn at temperatures below 0° C. At temperatures as low as −80° C. it remains flexible. The polymer is slowly attacked by organic bases. It exhibits an inherent viscosity of 1.89, measured at 0.1% concentration in chloroform at 25° C. Analysis indicates a copolymer having a chlorofluorothioacetyl fluoride content of about 2 mole percent. Analysis found: C, 15.08%; H, 0.59%; S, 40.40%; Cl, 0.66%.

EXAMPLE XXI

In a polymerization vessel cooled in a solid carbon dioxide/acetone mixture and blanketed with helium are placed 0.05 g. of cesium fluoride, 10 ml. of anhydrous diethyl ether, 7.5 g. of thiocarbonyl fluoride and 3 g. of perfluorocyclobutanone. The reaction mixture is stirred for 3 hours at −80° C. and is then poured into water at 55° C. The polymer is washed with acetone and is then treated with 300 ml. of chloroform. This solution obtained is filtered to remove insoluble polymer and the soluble polymer is precipitated by the addition of methanol. After drying in vacuo at 65° C. the polymer weighs 3.1 g.

The polymer is pressed to a soft, opaque film at 150° C. and 10,000 lb. ram pressure. It is slowly attacked by triethylamine. It exhibits an inherent viscosity of 0.40, measured at 0.1% concentration in chloroform solution at 25° C. Analysis indicates a copolymer of composition 86% thiocarbonyl fluoride and 14% perfluorocyclobutanone. Analysis found: C, 17.92%; F, 51.31%; S, 29.15%.

EXAMPLE XXII

A vessel similar to that used in Example XVI is purged with nitrogen and cooled to −80° C. There are introduced, in turn, 9.6 g. of thiocarbonyl fluoride, 2.4 g. of chlorofluorothioacetyl fluoride, and 0.045 g. of tri-n-butylboron as a 10% solution in heptane. The free oxygen present in the materials acts as the oxidizing agent. The mixture is maintained at −80° C. for 3 hours. Precipitation with methyl alcohol, washing, and drying as in Example XVI gives 4.0 g. of nontacky solid containing 2.47% chlorine. This chlorine content corresponds to a thiocarbonyl fluoride/chlorofluorothioacetyl fluoride copolymer containing 9% by weight of combined chlorofluorothioacetyl fluoride. A film pressed from the copolymer at 100° C. is easily extensible and pliable over a wide temperature range.

EXAMPLE XXIII

A vessel similar to that used in Example XVI is purged with nitrogen and cooled to −80° C. There are introduced, in turn, 1.1 g. of styrene, 1.6 g. of thiocarbonyl chloride fluoride, and 0.09 g. of tri-n-butylboron. The free oxygen present in the materials acts as the oxidizing agent. The mixture is maintained at −80° C. for 16 hours. Precipitation with methyl alcohol, washing, and drying as in Example XVI gives 1.1 g. of solid containing 27.48% sulfur and 31.34% chlorine. This corresponds to a copolymer containing about 86% by weight combined thiocarbonyl chlorofluoride and 14% styrene. A rubbery film is pressed from the copolymer at 100° C.

EXAMPLE XXIV

A vessel similar to that used in Example XVI is purged with nitrogen and cooled to −80° C. There are introduced, in turn, 2.2 g. of allylidene acetate, 0.6 g. of triethylboron as an 18.2% solution in heptane, 17.5 g. of thiocarbonyl fluoride, and 8 cc. of air (at normal temperature and pressure). The mixture is maintained at −80° C. for 16 hours. Precipitation with methyl alcohol, washing, and drying as in Example XVI gives 14.5 g. of a rubbery solid, which is shown to be a thiocarbonyl fluoride/allylidene acetate copolymer containing 10.8% by weight of combined allylidene acetate. An elastomeric film is pressed from the copolymer at 100° C.

EXAMPLES XXV–XLI

The procedures described in Examples XVI and XXII–XXIV are used to prepare other polymers and copolymers of thiocarbonyl compounds. These polymerizations and copolymerizations are summarized in the following table. Unless otherwise noted, no solvent is used (except for the hydrocarbylboron compound), "normal" addition is used, no oxidizing agent in addition to the oxygen already present is added, the reaction temperature is −80° C., and the precipitating and washing liquid is methyl alcohol. The order of addition of the monomers and initiators may or may not be critical. In what will arbitrarily be called "normal" addition, the solvent, if one is used, is added to the reaction vessel first, then the comonomer, then the thiocarbonyl compound, then the hydrocarbylboron compound, and finally the oxidizing agent, if any is required, in addition to the oxygen that may already be present. In what will arbitrarily be called "reverse" addition, the solvent, if any, is added to the reaction vessel first, then the comonomer, then the hydrocarbylboron compound, then the thiocarbonyl compound, and finally the oxidizing agent, if any is required in addition to the oxygen that may already be present. "Reverse" addition must be used when the comonomer is sufficiently basic that it can act as an anionic initiator (or coinitiator) for polymerization of the thiocarbonyl compound. Such polymerization usually gives homopolymer of the thiocarbonyl compound. Adding the hydrocarbylboron compound before the thiocarbonyl compound suppresses this anionic polymerization. An example of a comonomer that is basic enough to cause anionic polymerization is allylidene acetate, $CH_2=CH—CH(OCOCH_3)_2$. When there is no material present that is sufficiently basic to initiate anionic polymerization, either "normal" or "reverse" addition can be used.

EXAMPLE XLIV

To a 3/8" x 8" platinum tube sealed at the bottom and containing 2 mg. of benzoyl peroxide is charged 2.4 g. of thiocarbonyl fluoride, 2.4 g. of tetrafluoroethylene and 4.0 ml. of dichlorodifluoromethane, all of which have been degassed previously in vacuo using a helium purge. The tube is evacuated and sealed. It is placed in a pres- COPOLYMERIZATION OF THIOCARBONYL FLUORIDES WITH ETHYLENICALLY UNSATURATED MONOMERS

| Example | Thiocarbonyl compound, g. | Comonomer, g. | Hydrocarbyl boron compound, g. | Oxygen added as air, cc. | Time, hrs. | Product, g. | Wt. percent thiocarbonyl compound in copolymer | Properties of film |
|---|---|---|---|---|---|---|---|---|
| XXV | $CF_2=S$ (20 parts heptane solvent), 8.0. | Propylene, 9.4 | Bu₃B, 0.008 | 3 | 2 | 3.9 | 79 | Tough, elastomeric. |
| XXVI | $CF_2=S$, 1.6 | Ethylene, 0.4 | Et₃B, 0.008 | 6 | 18 | 2.5 | 80 | Elastomeric. |
| XXVII | $CF_2=S$, 3.4 | Vinylcyclohexane, 2.0. | Bu₃B, 0.038 | 6 | 18 | 4.4 | 72 | Tacky. |
| XXVIII | $CF_2=S$, 3.0 | 1,5-hexadiene, 1.4 | Et₃B, 0.075 | None | 18 | 0.7 | 64 | |
| XXIX | $CF_2=S$, 4.8 | Vinyl chloride, 6.4 | Et₃B, 0.028 | None | 18 | 1.7 | 71 | Tacky. |
| XXX | $CF_2=S$, 2.4 | Vinyl fluoride, 4.9 | Et₃B, 0.021 | 3.6 | 18 | 2.9 | 89 | Tough, opaque. |
| XXXI | $CF_2=S$, 1.4 | Allyl chloride, 2.2 | Et₃B, 0.025 | 3.6 | 18 | 1.7 | 66 | Tough, elastomeric, opaque, slightly crosslinked |
| XXXII | CClF=S, 1.6 | 2,3-dichloro-1,3-butadiene, 1.1. | Et₃B, 0.03 | None | 24 (0° C.) | 2.0 | 70 | Tough, elastomeric. |
| XXXIII | $CF_2=S$ ("reverse" addition), 1.6. | 3,3-diethoxypropene, 0.4. | Et₃B, 0.013 | 3.6 | 2 | | 60 | Elastomeric. |
| XXXIV | CClF=S, 4.0 | Vinyl acetate, 0.9 | Bu₃B, 0.015 | None | 16 | 4.0 | 97 | Tough. |
| XXXV | $CF_2=S$, 32.0 | Vinyl acetate, 4.7 | Bu₃B, 0.03 | None | 18 | 16.0 | 68 | Easily extensible. |
| XXXVI | $CF_2=S$ ("reverse" addition), 3.2. | Isopropenyl acetate, 2.7. | Bu₃B, 0.038 | 6.0 | 18 | 3.9 | 68 | Elastomeric, tough. |
| XXXVII | $CF_2=S$ ("reverse" addition), 3.0. | Allyl chloroformate, 3.2. | Bu₃B, 0.038 | 6.0 | 18 | 2.2 | 66 | Do. |
| XXXVIII | CClF=S, 1.6 | Ethyl acrylate, 0.9 | Bu₃B, 0.09 | None | 16 | 0.5 | 87 | Tough, easily extensible. |
| XXXIX | $CF_2=S$, 24.0 | 2-chloroethyl acrylate, 3.0. | Et₃B, 0.08 | None | 18 | 17.0 | 89 | Easily extensible, adhered to aluminum. |
| XL | CClF=S, 1.6 | Acrylonitrile, 0.8 | Bu₃B, 0.08 | None | 2 | 1.5 | 99 | Elastomeric. |
| XLI | $CF_2=S$ ("reverse" addition), 3.7. | Vinyltrimethylsilane, 1.8. | Bu₃B, 0.038 | 6.0 | 4 | 1.4 | 70 | Do. |

EXAMPLE XLII

In a 50-ml. round-bottom flask equipped with a magnetic stirrer and a condenser cooled by a mixture of solid carbon dioxide and acetone, is condensed 14 ml. of dichlorodifluoromethane and 8 ml. (12.8 g.) of thiocarbonyl fluoride, both materials having been thoroughly degassed in vacuo using a helium purge. The triethylboron catalyst (0.2 ml. of a 25.3% solution of triethylboron in heptane) is injected against a slight pressure of helium and, after complete mixing, 1.5 ml. (1.3 g.) of α,α-dimethylallyl isocyanate is injected in a similar manner. Finally, 0.2 ml. of a cold (−80° C.) 27% solution of diethylperoxyethylboron in heptane is injected rapidly and the mixture is stirred vigorously at −80° C., after which it is allowed to stand at −80° C. for about 16 hours. The solidified mass obtained is washed thoroughly with dry petroleum ether, dissolved in chloroform and finally reprecipitated with petroleum ether. The yield of the copolymer of thiocarbonyl fluoride and α,α-dimethylallyl isocyanate amounts to 8.3 g. This copolymer contains 8.8 mole percent of α,α-dimethylallyl isocyanate, is soluble in chloroform, and can be pressed into a film at 100° C. which can be redissolved in chloroform.

EXAMPLE XLIII

A solution of 0.02 g. of benzoin methyl ether, 1.6 g. of thiocarbonyl chloride fluoride (previously purified by vapor phase chromatography) and 0.9 g. of freshly distilled tertiary butyl acrylate is sealed under nitrogen in a "Pyrex" glass tube. The tube, cooled in ice water, is exposed 2 hours to the radiation from a 275 watt RS sunlamp at a distance of 12 inches. The contents of the tube sets to a gel as the color diminishes. The tube is cooled, and opened; the copolymer plug is broken up in methanol, dissolved in chloroform and reprecipitated in methanol. The elastic crumb obtained is pressed at 75° C. to give 2 g. of a clear, tough, pliable, elastomeric sheet. The elemental analysis of 24.98% carbon indicates that the copolymer contains 24% by weight, of combined tertiary butyl acrylate.

sure tube containing methanol as a heat transfer agent and is heated at 80° C. for 4 hours under 3000 atmospheres pressure. The tube is then cut open and the white rubbery copolymer present is removed. It is washed with methanol and extracted by shaking overnight with chloroform. The yield of product, M.P. 230–260° C., obtained amounts to about 1.5 g. It contains 48.1 mole percent of combined tetrafluoroethylene.

EXAMPLE XLV

The procedure of Example XLIV is repeated with the exception that α,α'-azodiisobutyronitrile is substituted for the benzoyl peroxide initiator. As in Example XLIV, a copolymer of thiocarbonyl fluoride and tetrafluoroethylene containing 65.4 mole percent of tetrafluoroethylene is obtained.

One of the advantages of this invention is that thiocarbonyl fluoride and thiocarbonyl chloride fluoride can be copolymerized with certain comonomers having reactive substituents to form copolymers which can be readily cured, or crosslinked, to products having improved elastomeric properties. For example, copolymers of thiocarbonyl fluoride or thiocarbonyl chloride fluoride with comonomers having carboxyl groups (or groups convertible to carboxyl) can be cured by reaction with epoxy compounds. Also, copolymers of thiocarbonyl fluoride and thiocarbonyl chloride fluoride with comonomers having isocyanate, chloroformate, and the like, groups can be cured by reaction with reagents having at least two replaceable hydrogens attached to oxygen or nitrogen.

More particularly, a method for vulcanizing some of the thiocarbonyl copolymers of this invention comprises mixing a copolymer of thiocarbonyl fluoride or thiocarbonyl chloride fluoride and an ethylenically unsaturated comonomer containing carboxyl groups, or groups convertible to carboxyl, e.g., ester and amide groups, with a small proportion, e.g., 2–20% of the weight of the thiocarbonyl polymer of an epoxy resin, e.g., commercially available epoxy resins known generically as "Epon" or "Oxiron" resins, or a monomeric polyepoxide, e.g., dicyclopentadiene dioxide or the diepoxide commercially available under the designation "Diepoxide AG–13E." This process is illustrated in greater detail by the following Examples A and B.

EXAMPLE A

A copolymer of thiocarbonyl fluoride and ethyl acrylate is prepared by polymerizing a mixture of thiocarbonyl fluoride and ethyl acrylate in the molar ratio of 20:1 in hexane at −80° C. with triethylboron/oxygen as catalyst. One part of this copolymer is stirred at room temperature with 3.54 parts of concentrated hydrochloric acid in 44.4 parts of tetrahydrofuran for 4 days. The polymer is precipitated with water and then dried. The polymer is mixed well with 0.04 part of a commercial epoxy resin known as "Epon" 1031, on a press at 75° C. by several pressings. The resulting mixture is then cured at 135° C. for 1 hour under a pressure of 1000 lb./sq. in. The resulting cured polymer is no longer soluble in chloroform.

EXAMPLE B

One part of a copolymer of thiocarbonyl fluoride and tertiary butyl acrylate containing 95.6 weight percent of thiocarbonyl fluoride is mixed with 0.05 part of a commercial epoxy resin known as "Epotuf" ED–1025 in 425 parts of chloroform and allowed to stand at room temperature for 20 hours. A uniform gel is formed which is pressed into a sheet at 50° C. to remove the chloroform. This sheet is divided into two portions and one portion is cured at 140° C. for 3 hours under 2000 lb./sq. in. pressure and the other portion is cured for 18 hours under the same conditions of temperature and pressure. The sheet which is cured for 3 hours has an equilibrium weight gain in chloroform of 250%, while the portion cured for 18 hours shows an equilibrium weight gain of 100%. The uncured composition is completely soluble in this solvent.

The second method mentioned above for vulcanizing certain of the thiocarbonyl polymers of this invention involves treating a copolymer of thiocarbonyl fluoride or thiocarbonyl chloride fluoride and an ethylenically unsaturated comonomer having an isocyanate, isothiocyanate, chloroformate or acyl halide group with a reagent containing at least two replaceable hydrogens attached to oxygen or nitrogen, e.g., an amide, amine, ammonia, alcohol and water. This process is illustrated in further detail by the following Examples C and D.

EXAMPLE C

One hundred parts of a copolymer of thiocarbonyl fluoride and allyl chloroformate containing 95% by weight of combined thiocarbonyl fluoride is mixed with 3 parts of sym.-diisopropyl urea on a press at 50° C. The resulting sheet is curved at 100° C. under 1000 lb./sq. in. pressure for 1 hour. The cured copolymer is no longer soluble in chloroform and has improved tensile properties at elevated temperatures.

EXAMPLE D

One part of the thiocarbonyl fluoride/α,α-dimethylallyl isocyanate copolymer of Example XLII is mixed with 0.05 part of methylene-bis-o-chloroaniline by pressing together several times on a press heated at 100° C. The composition is then cured by heating at 100° C. for 1 hour under 10,000 lb./sq. in. pressure. The cured elastomer does not flow at elevated temperatures under stress and is insoluble in chloroform, whereas the original copolymer flows very readily and is completely soluble in chloroform.

The thiocarbonyl fluoride polymers of this invention are especially useful because of the particular combination of properties that they possess. In addition to exhibiting a high degree of chemical inertness they are soluble in certain organic solvents and this solubility permits their use as coating compositions for application to various substrates such as fabrics, wood, metal and glass. The high molecular weight polymers of this invention also possess melting points in the range which permits them to be shaped into various objects by extrusion, pressing or by molding or pressed into flexible self-supporting films that are chemically inert.

The copolymers of this invention are particularly useful for the treatment of many types of fabrics for water-repellency. This use is illustrated by the following experiments. A 2% solution of a copolymer of thiocarbonyl fluoride and α,α-dimethylallyl isocyanate, containing 86% by weight of combined thiocarbonyl fluoride, in xylene is prepared. Swatches of cotton, cellulose acetate, "Dacron," nylon and "Orlon" fabrics are immersed in this solution for 3 hours at 150° C. and then are air-dried. Drops of water are placed on each of these treated samples and the drops are not absorbed by the fabrics after 15 minutes. In contrast, swatches of the same fabrics completely absorb the drops of water in one minute or less.

The fabric swatches treated as described above are washed for 30 minutes in water containing 0.5% of synthetic detergent at 50–60° C., rinsed three times in water at 60° C. and air-dried. These laundered swatches are still water-repellent.

The laundered swatches of these fabrics are next dry-cleaned by agitating for two 15-minute periods in perchloroethylene and then air-dried. The fabric samples remain water-repellent after this dry-cleaning treatment.

The dry-cleaned swatches are finally washed for 15 minutes in water containing 0.5% of synthetic detergent at 90–95° C. and then air-dried. All samples of the treated fabrics are still water-repellent after the entire series of washing, dry-cleaning and washing treatments.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Thiocarbonyl chloride fluoride.
2. Homopolymers having a molecular weight of at least 2000 and having as the sole recurring units those of the formula

wherein X is a halogen of the group consisting of fluorine and chlorine.

3. Homopolymers of claim 2 in the form of self-supporting structures.
4. Homopolymers of claim 2 in the form of self-supporting films.
5. A homopolymer of thiocarbonyl difluoride having a molecular weight of at least 2000.
6. A copolymer of a thiocarbonyl fluoride of the formula S=CFX, wherein X is a halogen of the group consisting of fluorine and chlorine, with at least one other ethylenically unsaturated compound that undergoes vinyl-type polymerization, said copolymer having a molecular weight of at least 2000.
7. Copolymers of claim 6 in the form of self-supporting films.
8. A copolymer of a thiocarbonyl fluoride of the formula S=CFX, wherein X is a halogen of the group consisting of fluorine and chlorine, with at least one compound of the class consisting of thioacyl fluorides and; said copolymer having a molecular weight of at least 2000.
9. Copolymers of claim 8 in the form of self-supporting films.

10. A copolymer of thiocarbonyl difluoride with at least one ethylenically unsaturated compound that undergoes vinyl-type polymerization, said copolymer having a molecular weight of at least 2000.

11. A copolymer of thiocarbonyl chloride fluoride with at least one ethylenically unsaturated compound that undergoes vinyl-type polymerization, said copolymer having a molecular weight of at least 2000.

12. Process for preparing addition polymers having the

recurring unit which comprises polymerizing at a temperature of from 0° to −120° C. in a solvent which is liquid at said temperature a compound of the formula S=CFX, wherein X is a halogen of the group consisting of fluorine and chlorine, in the presence of from 0.2 to 20% of dimethylformamide, based on the weight of said compound, the polymerization being effected in a period ranging from about 1 hour up to four days.

References Cited by the Examiner
UNITED STATES PATENTS

| | | | |
|---|---|---|---|
| 3,032,537 | 5/1962 | Walter | 260—79 |
| 3,069,396 | 12/1962 | Middleton | 260—79 |
| 3,069,397 | 12/1962 | Kealy | 260—79 |
| 3,113,936 | 12/1963 | Middleton | 260—79 |

OTHER REFERENCES

Tyczkowski: J.A.C.S. 75, pp. 3523–67, 1953.

LEON J. BERCOVITZ, *Primary Examiner.*

MARK LIEBERMAN, *Examiner.*